US012365767B2

(12) United States Patent
Thoniyot

(10) Patent No.: US 12,365,767 B2
(45) Date of Patent: Jul. 22, 2025

(54) SYNTHESIS OF POLYESTER BASED POLYMERS WITHOUT USE OF ORGANIC SOLVENTS

(71) Applicant: Agency for Science, Technology and Research, Singapore (SG)

(72) Inventor: Praveen Thoniyot, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 909 days.

(21) Appl. No.: 17/438,773

(22) PCT Filed: Apr. 9, 2020

(86) PCT No.: PCT/SG2020/050218
§ 371 (c)(1),
(2) Date: Sep. 13, 2021

(87) PCT Pub. No.: WO2020/214089
PCT Pub. Date: Oct. 22, 2020

(65) Prior Publication Data
US 2022/0169801 A1   Jun. 2, 2022

(30) Foreign Application Priority Data
Apr. 15, 2019   (SG) .............. 10201903383X

(51) Int. Cl.
*C08G 81/02*   (2006.01)
*C08G 63/08*   (2006.01)
(Continued)

(52) U.S. Cl.
CPC .......... *C08G 81/027* (2013.01); *C08G 63/08* (2013.01); *C08G 63/78* (2013.01); *C08G 63/823* (2013.01)

(58) Field of Classification Search
None
See application file for complete search history.

(56) References Cited

U.S. PATENT DOCUMENTS 3,057,892 A    10/1962   Groote
3,980,749 A *  9/1976   Cottis ................... C08J 3/24
                                              264/83

(Continued)

FOREIGN PATENT DOCUMENTS

CN   101921466 A  * 12/2010
CN   106832243 A  *  6/2017
(Continued)

OTHER PUBLICATIONS

International Search Report for International Application No. PCT/SG2020/050218 dated Sep. 23, 2020, pp. 1-3.
(Continued)

*Primary Examiner* — Eli D. Strah
(74) *Attorney, Agent, or Firm* — Shackelford, McKinley & Norton, LLP

(57) ABSTRACT

An organic solvent-free method of producing a polyester is disclosed herein. The method may include providing a mixture comprising at least one precursor of the polyester, wherein the at least one precursor is a liquid, and contacting the mixture with a gaseous inorganic acid to produce the polyester. A polyester obtained according to such a method is also disclosed herein.

19 Claims, 7 Drawing Sheets

(51) Int. Cl.
    *C08G 63/78*    (2006.01)
    *C08G 63/82*    (2006.01)

(56)  References Cited

U.S. PATENT DOCUMENTS 8,044,151 B2    10/2011    Asahara et al.
  2014/0100350 A1*   4/2014   He ..................... C08G 63/87
                                                      528/274

FOREIGN PATENT DOCUMENTS

CN    107163237 A    9/2017
  WO      9518170 A1   7/1995
  WO      0222593 A1   3/2002
  WO   2018182509 A1  10/2018

OTHER PUBLICATIONS

Written Opinion of the International Searching Authority for International Application No. PCT/SG2020/050218 dated Sep. 23, 2020, pp. 1-4.
Grossen et al., "PEG-PCL Based Nanomedicines: A Biodegradable Drug Delivery System and its Application," Journal of Controlled Release, vol. 260, 2017, pp. 46-60.
Huang et al., "Degradation and Cell Culture Studies on Block Copolymers Prepared by Ring Opening Polymerization of E-Caprolactone in the Presence of Poly(ethylene glycol)," Journal of Biomedical Materials Research Part A, vol. 69, No. 3, 2004, pp. 417-427.
Shibasaki et al., "Activated Monomer Cationic Polymerization of Lactones and the Application to Well-Defined Block Copolymer Synthesis with Seven-Membered Cyclic Carbonate," Macromolecules, vol. 33, 2000, pp. 4316-4320.
Ianiro et al., "One-Pot, Solvent-Free, Metal-Free Synthesis and UCST-Based Purification of Poly(ethylene oxide)/Poly-E-caprolactone Block Copolymers," Journal of Polymer Science, Part A: Polymer Chemistry, vol. 54, 2016, pp. 2992-2999.
Piao et al., "Synthesis and Characterization of PCT/PEG/PCL Triblock Copolymers by Using Calcium Catalyst," Polymer, vol. 44, 2003, pp. 2025-2031.
Gindy et al., "Composite Block Copolymer Stabilized Nanoparticles: Simultaneous Encapsulation of Organic Actives and Inorganic Nanostructures," Langmuir, vol. 24, 2008, pp. 83-90.
Zhou et al., "Biodegradable Poly(E-caprolactone)-Poly(ethylene glycol) Block Copolymers: Characterization and their use as Drug Carriers for a Controlled Delivery System," Biomaterials, vol. 24, No. 20, 2003, pp. 3563-3570.

* cited by examiner

FIG. 3

| Catalyst | Solvents | Temperature of reaction | Time taken | Purification steps of PEG-PCL formed | Solvent used for reaction and/or purification | Yield% | Amount of PEG-PCL produced | PCL chain length achieved |
|---|---|---|---|---|---|---|---|---|
| Sn(Oct)$_2$ | Nil | 160°C | 4 hrs | Dissolved in DCM and precipitated in cold methanol/hexane | No solvent used for synthesis reaction but solvent used for purification | >80 | 5 mg to 1 g scale | 500-20000 |
| HCl in ether (activator) | n-butyl alcohol & DCM | 25°C | 24 hrs | precipitated in n-hexane | 300 mL of hexane used for precipitation | 92 | 1.08 g | 3000-10000 |
| Fumaric Acid | Nil | 100°C | 24h | add EtOH, heat <60°C till dissolved. Cooled to room temperature and stored in freezer at -18°C. Precipitated after ~2hrs and washed with -18°C EtOH | No solvent used for reaction. Purification: the EtOH needed depends on the extrapolated solubility data for fumaric acid (FA) in ethanol to remove all FA. | >70 | 1 g to 10 g | 450-2200 |
| Ca and NH$_3$ | Xylene | 80°C | 24h | Dissolved in CHCl$_3$ and ppt in IPA | Xylene used for reaction CHCl$_3$ used for purification | >70 | in the range of mg to gram | - |
| HCl in ether | DCM | rtp | 24h | Precipitated in cold hexane | DCM used for reaction CHCl$_3$ used for purification | 92 | in the range of gram | - |
| Sn(Oct)2 | - | 160°C | - | Precipitation used but liquid used for precipitation not indicated | Not specifically mentioned | >70 | in the range of mg to gram | - |

SYNTHESIS OF POLYESTER BASED POLYMERS WITHOUT USE OF ORGANIC SOLVENTS

CROSS-REFERENCE TO RELATED APPLICATION

This application claims the benefit of priority of Singapore Patent Application No. 10201903383X, filed 15 Apr. 2019, the content of it being hereby incorporated by reference in its entirety for all purposes.

TECHNICAL FIELD

The present disclosure relates to a method of producing a polyester, which at the least, does not require organic solvents. The present disclosure also relates to a polyester produced from the method.

BACKGROUND

Polyester based homopolymers, e.g. polycaprolactone (PCL), which may be known as poly(ε-caprolactone), and polyethylene glycol (PEG) based block copolymers, e.g. polyethylene glycol co-polycaprolactone (PEG-b-PCL) are expected to be useful as polymers for encapsulation in diverse applications, such as nanomedicine and consumer care. Due to their unique biocompatible and biodegradable nature, these polymers may have been increasingly used in academia and industry.

Methods for producing such polymers may include, for example, using dry PEG as the macro initiator and caprolactone as the monomer (FIG. 2). However, such methods, including other approaches, involve toxic metals, e.g. tin, and the purification steps may involve multiple precipitation steps, wherein use of at least one solvent may be inevitable even if the synthesis reaction happens not to require a solvent. Besides, other methods happened to be mostly solvent based approaches. Such methods, involving the use of solvent, not only adds up to a lot in terms of cost, but also in terms of an environmental burden from (i) solvent removal and (ii) energy expenditure for solvent and toxic metal removal.

The manufacture of synthetic polymers, especially aliphatic polyesters such as PCL, poly(lactide-co-glycolide) (PLGA), poly(lactic acid) and poly(glycolic acid) (PGA), may also suffer from the limitations mentioned above. These polymers attracted great research interest possibly due to usefulness in drug delivery systems. For example, PCL is one of the polymers that has been worked on, as it is deemed inexpensive, biodegradable, lack of toxicity, possesses great permeability and at the same time miscible with a variety of polymers to render uniform drug distribution in a formulation matrix, thereby demonstrating for its excellent drug delivery properties.

However, PCL has its shortcomings, which include high crystallinity and hydrophobicity. The hydrophobicity renders degradation under human body conditions (by simple hydrolysis) to be detrimentally slow, and the high crystallinity decreases its biodegradability and compatibility with soft tissues. These shortcomings may therefore require PCL to be coupled with another non-toxic polymer such as methoxy poly(ethylene glycol) (mPEG) to improve on PCL's biocompatibility.

mPEG independently possesses useful properties, e.g. being certified non-toxic (by US Food and Drug Administration), hydrophilic (e.g. moisturizing, rendering a good feeling of the skin), biocompatible, environmentally benign, flexible and having great solubility in both water and organic solvent. Moreover, block polymers consisting of one or more PEG chains may easily form micelles in aqueous solution at room temperature to assist in drug delivery using the polymers as a carrier system. Not only does the copolymer formed from ε-CL and mPEG have improved hydrophilicity and biodegradability, it may also be more stable, water soluble, biocompatible and bioresorbable.

Due to advantages afforded by PEG-PCL, researchers developed various routes for synthesis of PEG-PCL. Examples of some reported methods are depicted in FIG. 3. In one method, PEG-PCL was synthesized using stannous octoate $Sn(Oct)_2$ as catalyst at 160° C. for 4 hrs. In another method, calcium ammoniate catalyst and xylene solution were used to produce PEG-PCL at 60° C. for 24 hrs. In another method, HCl in ether and dichloromethane (DCM) solvent were used at room temperature for 24 hrs. All these methods required organic solvents and/or require numerous purification steps that may involve organic solvents, even if the PEG-PCL synthesis reaction itself did not require, which is a limitation already mentioned above. Moreover, high temperatures, long reaction time, low conversion yield, and/or toxic catalyst was involved, and the complete removal of catalyst residue from the synthesized PEG-PCL polymer was rendered difficult due to various materials involved.

There is thus a need to provide for a solution that addresses one or more of the limitations mentioned above. The solution should at least provide for a method of synthesizing PEG-PCL copolymers in a one-pot solvent-free reaction.

SUMMARY

In a first aspect, there is provided for an organic solvent-free method of producing a polyester, the method comprising:

providing a mixture comprising at least one precursor of the polyester, wherein the at least one precursor is a liquid; and contacting the mixture with a gaseous inorganic acid to produce the polyester.

In another aspect, there is provided a polyester obtained according to various embodiments of the first aspect.

BRIEF DESCRIPTION OF THE DRAWINGS

The drawings are not necessarily to scale, emphasis instead generally being placed upon illustrating the principles of the invention. In the following description, various embodiments of the present disclosure are described with reference to the following drawings, in which:

FIG. 3 is a table indicating reported synthesis methods of PEG-PCL.

DETAILED DESCRIPTION

Figure 1A:
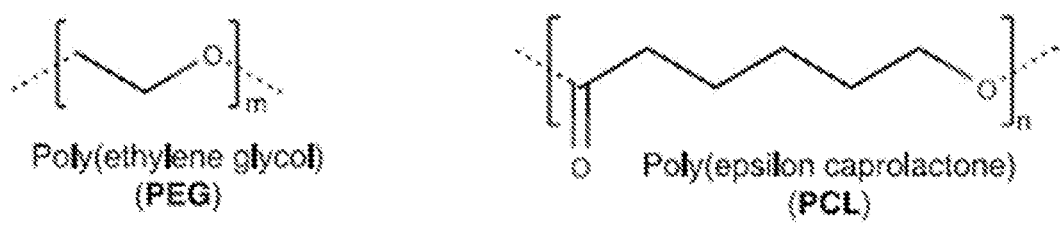
FIG. 1A shows the structure of PEG and PCL. Any PEG suitable for the present method may be used. For example, a PEG having a Mn from 200 to 100,000 may be used, wherein Mn denotes number average molecular weight. Based on such a range as a non-limiting example, m may be an integer ranging from 4 to 23000. For instance, if a PEG having a Mn of 5000 happens to be used, m may be 114. For n, it may be an integer that depends on the amount of monomer used in the reaction. The monomer happens to be a ε-CL monomer in this instance, and n may vary from 8 to 80. As an example, m may be 114 and n may be 66. Nevertheless, m an n may be integers of at least 1.
Figure 1B:
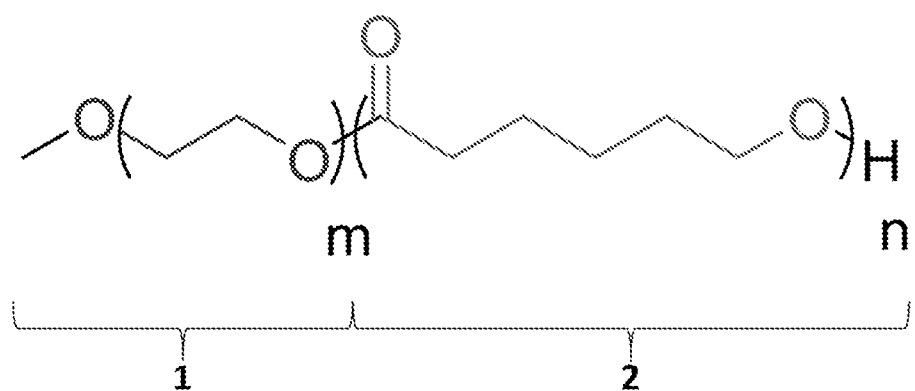
FIG. 1B shows the structure of PEG-PCL. Portion 1 represents the hydrophilic PEG block. Portion 2 represents the hydrophobic PCL block. m and n may be integers as defined above for FIG. 1A.
Figure 2:
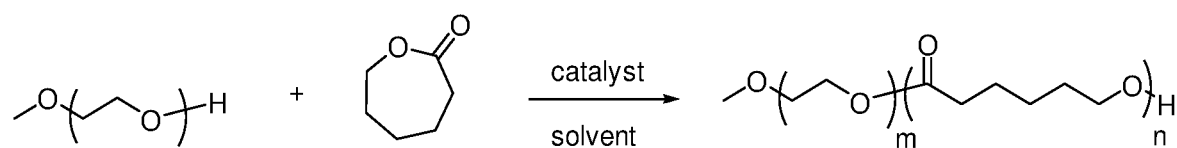
FIG. 2 depicts a synthesis scheme for producing PEG-PCL involving a solvent. m and n may be integers as defined above for FIG. 1A.

The following detailed description refers to the accompanying drawings that show, by way of illustration, specific details and embodiments in which the invention may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to a method of producing a polyester, and a polyester produced/producible from the method. The polyester may be a homopolymer, a random copolymer, or a block copolymer. The term "homopolymer" herein refers to a polymer produced from a single monomer. The term "copolymer" herein refers to a polymer produced from two monomers.

The present method is sustainably and environmentally friendly. The present method is able to produce a polyester without a solvent, metal and organic catalyst. That is to say, apart from the reactants for forming the polyester, the method may utilize only a salt and a mineral (i.e. inorganic) acid, e.g. sulfuric acid, to form a gaseous acid catalyst for producing the polyester. The present method does not require complex and multiple purification steps, as bubbling an inert gas (e.g. nitrogen, argon) suffices to purify the resultant polyester. Moreover, a polyester can be produced at lower temperatures (e.g. below 70° C.) via the present method, compared to conventional methods involving higher temperatures.

Advantageously, in the present method, a gaseous mineral acid (e.g. HCl) may be generated in situ. The gaseous mineral acid generated may be stabilized in one or more of the reactants, which may include a polymerization initiator for the polyester to be formed from one or more monomers. The polymerization initiator may be any chemical species that starts a polymerization by reacting with a monomer to generate an intermediate propagating species for linking successively a large number of other monomers of the same or different kind to form a polymer. The polymerization initiator may be a small molecule or a macromolecule. For example, the gaseous mineral acid may be stable in a polymerization initiator (e.g. mPEG of various molecular weight may be used) at 70° C. or lower in a concentration sufficient to catalyze a lactone ring opening to form an intermediate species capable of ring opening of a monomer for producing the polyester. Conventionally, when a mineral acid is used as a catalyst, an aqueous solvent tends to be required, but the present method circumvents this. When a mineral acid, such as HCl, is used as the catalyst for polymerization to produce a polyester, the mineral acid may typically be in the form of a solution, as HCl is volatile and evaporates easily at higher temperatures needed for the polymerization to be carried out. However, the present method involves impregnation of gaseous HCl into one or more of the reactants, including the polymerization initiator, for HCl to be present as a catalyst for the polymerization (i.e. synthesis) of a polyester. Said differently, no solvents are required as gaseous HCl in the present method gets captured in the reactants for producing the polyester, thereby eliminating need for solvents (i.e. solvent-free).

Details of various embodiments of the present method and polyester, and advantages associated with the various embodiments are now described below.

Various embodiments of the first aspect relate to an organic solvent-free method of producing a polyester, the method may comprise providing a mixture comprising at least one precursor of the polyester, wherein the at least one precursor is a liquid, and contacting the mixture with a gaseous inorganic acid to produce the polyester.

In various embodiments, the polyester may comprise a homopolymer, a random copolymer, or a block copolymer. The homopolymer may comprise poly(ε-caprolactone), poly (lactic acid), or poly(glycolic acid). The random copolymer or the block copolymer may comprise polyethylene glycol co-polycaprolactone, poly(lactic-co-glycolic acid), polyethylene glycol co-polyvalerolactone, or a polyester appended to polyethylene glycol. The term "polyethylene glycol co-polycaprolactone" herein may be exchangeably used with "poly(ethylene glycol)-poly(ε-caprolactone)" and the abbreviation "PEG-b-PCL" herein may be exchangeably used with "PEG-PCL". The term "polyethylene glycol" herein may be exchangeably used with "poly(ethylene glycol)".

In various embodiments, the at least one (i.e. one or more) precursor may comprise at least one monomer of the polyester or at least one oligomer of the polyester. The term "precursor" herein refers to a monomer, oligomer, or even a polymer for forming the polyester. The term "oligomer" herein refers to a molecule having repeating units of one or more monomers, wherein the number of repeating units is less than a polymer. For example, the precursor may be methoxy poly(ethylene glycol) (mPEG) and/or ε-caprolactone (ε-CL).

In the present method, providing the mixture may comprise removing water from the at least one precursor. Removing the water may comprise contacting the at least one precursor with a drying agent. The drying agent may comprise activated silica, calcium chloride, calcium hydride, or an inert gas. In the absence of a drying agent, water residing in the at least one precursor may be an impurity that initiates undesirable polymerization to form a mixture of polyesters having different terminal functional groups. However, the steps of removing water and contacting the at least one precursor with the drying agent may be optional, i.e. not needed, where water happens to be used as a polymerization initiator.

In various embodiments, the mixture may comprise a polymerization initiator. The polymerization initiator may be used to polymerize the precursors (e.g. monomers) to form the polyester. The polymerization initiator may comprise a polyether, an alcohol, or water. A non-limiting example of the polyether may be polyethylene glycol. A non-limiting example of the alcohol may be an ethanol. In various embodiments, the polymerization initiator may comprise an alcohol, water, or a polyethylene glycol having one or more terminal hydroxyl groups.

Polyethylene glycol may be used as the initiator in various instances, and in such instances, there may be the addition of a polyester to one end of the polyethylene glycol. That is to say, a block copolymer of polyether-polyester may be formed. The polyethylene glycol used as a polymerization initiator may be or may comprise a methoxy poly(ethylene glycol) (mPEG).

An alcohol may be used as an initiator. Non-limiting examples of the alcohol may include methanol, ethanol, propanol, etc. In this case, the polycaprolactone produced may have one end group comprising methyl ester, ethyl ester, or an alcohol ester (depending on the alcohol that is used) and the other end group may comprise a hydroxyl group. The present method for making PEG-PCL as described herein may be used. In this instance, the number of moles of alcohol may replace the number of moles of PEG. The melting step for melting the monomer may not be necessary since the alcohol is already a liquid. The resultant polymer molecular weight may be controlled by varying the amount of caprolactone monomer in the system. In instances where two types of polymerization initiators happened to be used, e.g. mPEG and alcohol, the mPEG need not be melted as the mPEG may dissolve in the alcohol. Polymerization in the presence of such initiators may lead to a mixture of polymers, e.g. one polymer may have terminal alcohol groups and another polymer having a terminal PEG.

When water is used as an initiator, the polycaprolactone produced may have a carboxyl group as one end group and hydroxyl group as the other end group. The present method for making PEG-PCL as described herein may be used. In this instance, the number of moles of water may replace the number of moles of PEG. The melting step for melting the monomer may not be necessary when water is used, which may be similar to the case when ethanol is used as the initiator. Similarly, in instances where two types of polymerization initiators happened to be used, e.g. mPEG and water, the mPEG need not be melted, and polymerization in the presence of such initiators may lead to a mixture of polymers, e.g. one polymer may have terminal hydroxyl groups and another polymer having a terminal PEG. However, the gaseous HCl may have to be dried even though water is used as the initiator to control the polymer's (i.e. the resultant polyester) molecular weight. The polymer's molecular weight may be controlled by varying the amount of caprolactone monomer in the system with a fixed amount of water. If the gaseous catalyst (HCl) happens to introduce moisture, it may lead to lower molecular weight than originally targeted for a given amount of water, when water is used as the initiator.

In the present method, contacting the mixture with the gaseous inorganic acid may comprise generating the gaseous inorganic acid from a chemical agent capable of generating the gaseous inorganic acid. Generating the gaseous inorganic acid may comprise mixing (i) sulfuric acid with sodium chloride or (ii) mixing an alcohol with an acetyl chloride or an acid chloride. Generation of the gaseous inorganic acid, such as gaseous hydrochloric acid, may comprise mixing formyl chloride or acetyl chloride (or any acid chloride) with methanol (or ethanol or any other alcohol). In various embodiments, the gaseous inorganic acid may comprise gaseous hydrochloric acid or gaseous nitric acid.

The present method may further comprise drying the gaseous inorganic acid prior to contacting the mixture with the gaseous inorganic acid. Drying the gaseous inorganic acid may comprise removing water from the gaseous inorganic acid. As already mentioned above, if the gaseous catalyst (HCl) happens to introduce moisture, it may lead to lower molecular weight than originally targeted. In addition to the lower molecular weight, the resultant polymer may undesirably end up being a mixture of polyesters, which may include a polyester having terminal hydroxyl groups and a polyester having a terminal moiety formed from the polymerization initiator used. For example, if the polymerization initiator used happens to be mPEG, the terminal moiety may then be PEG.

In various embodiments, removing the water from the gaseous inorganic acid may comprise contacting the gaseous inorganic acid with a drying agent. The drying agent may comprise activated silica, calcium chloride, or anhydrous sulfuric acid. The removal of water from the gaseous inorganic acid may comprise contacting the gaseous inorganic acid with any drying agent that may be commercially available. In the absence of a drying agent, the presence of water in the gaseous inorganic acid may get carried over to the at least one precursor and the water may initiate undesirable polymerization to form a mixture of polyesters having different terminal functional groups. However, the steps of removing water and contacting the at least one precursor with the drying agent may be optional, i.e. not needed, where water happens to be desirably used as a polymerization initiator.

In the present method, contacting the mixture with the gaseous inorganic acid may be carried out in an inert environment. The inert environment may comprise argon or nitrogen.

In various embodiments, contacting the mixture with the gaseous inorganic acid may be carried out at a temperature which maintains the polyester in a liquid state. The temperature may be at least 60° C. For example, the temperature may be 100° C. or less, 90° C. or less, 80° C. or less, 70° C. or less, etc. The gaseous inorganic acid is maintained in the at least one precursor or polymerization initiator at this temperature without compromising the rate of polymerization.

The present method may further comprise subjecting the mixture to an inert gas flow to remove the gaseous inorganic acid after the polyester is produced. As already mentioned above, no other purification steps are needed to obtain the resultant polyester, and utilizing an inert gas already used during the synthesis reaction renders the present method more straightforward and economically advantageous.

The present disclosure also provides for a polyester obtained or obtainable from a method described according to various embodiments of the first aspect. Embodiments and advantages described for the present method of the first aspect can be analogously valid for the present polyester mentioned herein, and vice versa. As the various embodiments and advantages have already been described above and through the examples demonstrated herein, they shall not be iterated for brevity.

The word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure includes a method of synthesizing PEG-PCL copolymer, and PEG-PCL produced from the method. The present method may involve synthesizing PEG-PCL copolymers in a one-pot solvent-free reaction using only HCl gas as catalyst. The method (e.g. polymerization) can be completed in 4 hrs. The HCl gas can be easily removed and no further purification to the final product may be needed. The PEG-PCL copolymer may be characterized by nuclear magnetic resonance ($^1$H NMR) and gel permeation chromatography (GPC).

As a non-limiting example, poly(ethylene glycol)-poly(ε-caprolactone) (PEG-PCL) copolymers were synthesized from methoxy poly(ethylene glycol) (mPEG) (Mn=5000) and ε-caprolactone (ε-CL) using, for example, HCl gas as a catalyst at 60° C. The polymerization was solvent-free and no purification of the final products was needed, which eliminates usage of solvent, qualifying the present method as a green synthesis method. This one-pot solvent-free polymerization is environmental friendly and non-toxic which makes it an attractive route to synthesize PEG-PCL highly suitable for use in drug delivery system.

The present method and polymer are described in further details, by way of non-limiting examples, as set forth below.

Example 1: Materials

All materials used in the present examples, which include methoxy poly(ethylene glycol) (mPEG, Mn=5000 by supplier, Mn=5740 by our GPC measurements), ε-caprolactone (ε-CL), concentrated sulfuric acid ($H_2SO_4$) and sodium chloride (NaCl), sodium hydroxide (NaOH) and oxalic acid, were purchased from Aldrich. Dried mPEG was prepared by melting mPEG in a silicon oil bath heated at 60° C. and bubbled with argon for an hour via a syringe needle before subjecting the melted solution to vacuum overnight under stirring. ε-caprolactone (ε-CL) was stirred in $CaH_2$ for 48 hrs at room temperature (20° C. to 40° C.) and distilled under reduced pressure prior usage. Concentrated $H_2SO_4$ and NaCl were used as received. Mn denotes number average molecular weight.

Example 2: Present Method

Figure 4A:
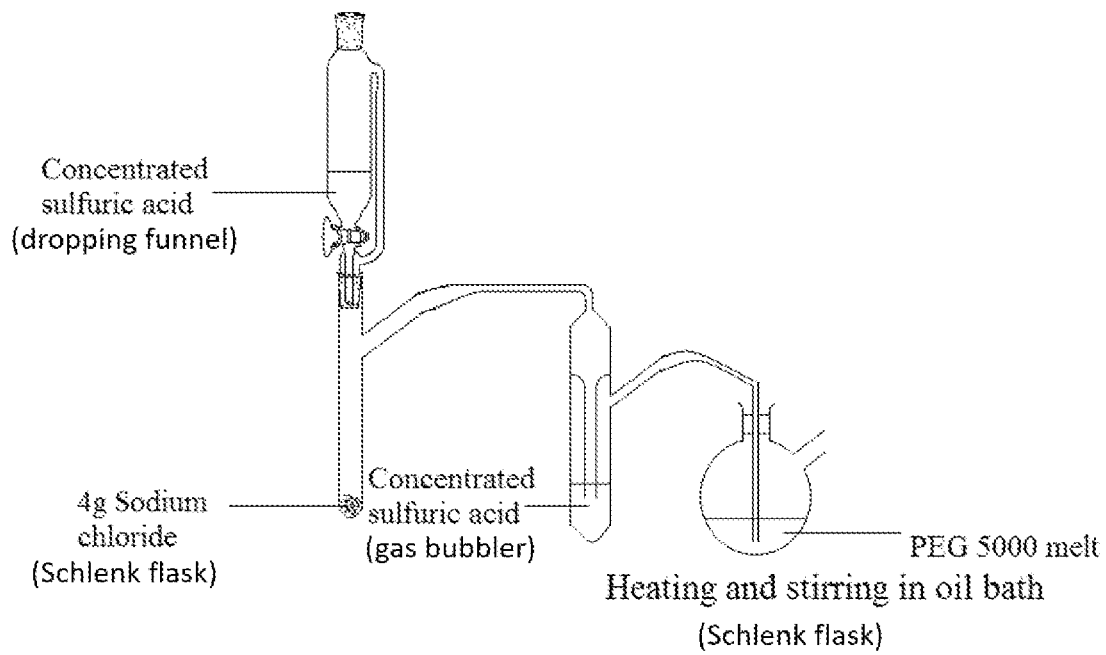
FIG. 4A illustrates a non-limiting example of a setup for carrying out the present method.
Figure 4B:
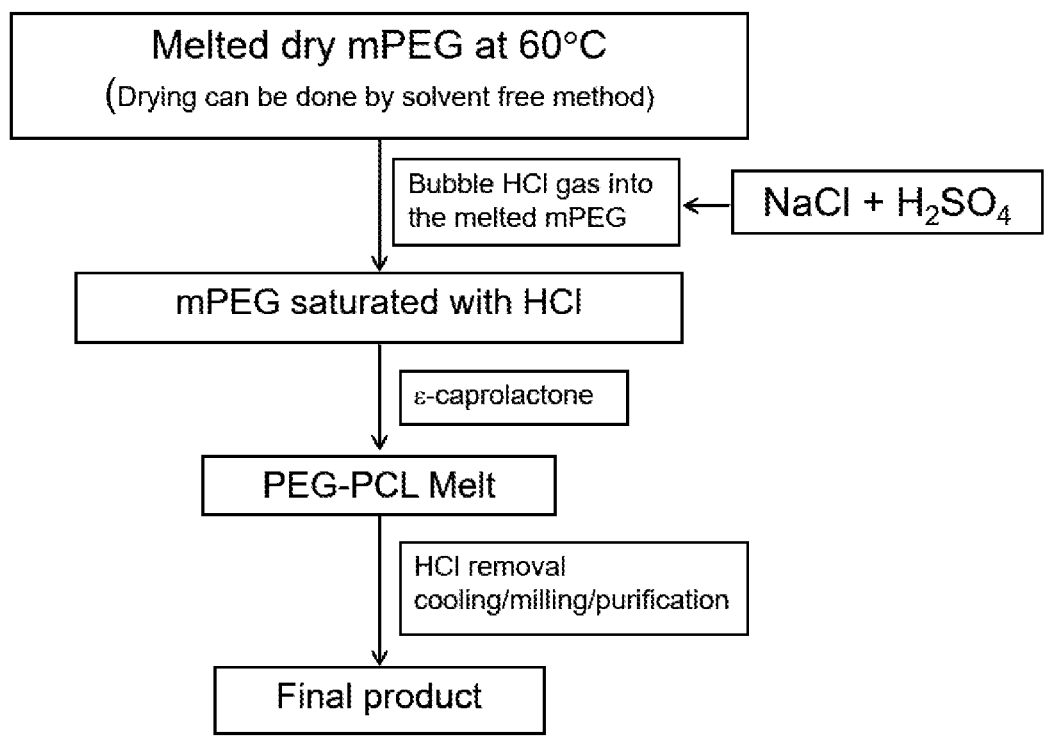
FIG. 4B is a schematic diagram showing steps of the present method.

A setup for the present method is illustrated using FIG. 4. Prior to polymerization (i.e. synthesis of PEG-PCL), 10 mL concentrated $H_2SO_4$ was added into a dropping funnel and NaCl (4 g, 68.4 mmol) was added in a schlenk flask connected to the dropping funnel. The HCl gas evolved from the reaction of NaCl and $H_2SO_4$ passes into and through the inlet of a gas bubbler filled with sufficient concentrated $H_2SO_4$ for drying of the HCl gas evolved. The dried HCl gas was then bubbled into another schlenk flask that was connected to the outlet of the gas bubbler. The schlenk flask connected to the outlet of the gas bubbler contained a mixture of pre-dried mPEG Mn=5000 (10 g, 2 mmol) and distilled ε-CL (15 mL, 135 mmol). The mixture was heated in a silicon oil bath at 60° C. for 20 hrs under argon gas. A slow and progressive viscosity increase of the mixture was observed during the polymerisation. Once the reaction was completed, argon gas was bubbled for another 20 minutes through the mixture to remove HCl. In another example discussed below, an ethanol may be involved, which was used not as a solvent but as an initiator for the polymerization. The mixture was then left to cool to room temperature before sending for characterization, e.g. by $^1$H NMR analysis.

During polymerization, HCl may be protonating to the monomer (e.g. ε-CL), initiator (e.g. mPEG), or the growing polymer chain. Gaseous HCl is used as a catalyst. During polymerization, the HCl happens to be in the bound form in the system, and after polymerization, the bound HCl may be removed by heating to a higher temperature and/or bubbling an inert gas.

As mentioned above, HCl may be protonating/bound to the monomer, initiator or the growing polymer chain. To elaborate on this, before polymerization begins, the reactants (e.g. monomer or a mPEG initiator) may be impregnated with HCl gas by contacting the reactants with the HCl gas. Once polymerization (e.g. forming the copolymer PEG-PCL) starts, the HCl gas may be bound to any of the reactants, e.g. the formed polyester, monomer, or some of the HCl gas may be in its free state (i.e. not bound to any materials). An equilibrium between the bound HCl and free HCl may be established. As not all HCl may be in its free state, only a fraction of the gaseous HCl used (i.e. free HCl not captured by or in the reactants) may be evaporated at the temperature used, and the gaseous HCl that remains is still sufficient to catalyze the ring opening, for example, of a caprolactone, for its polymerization to form the polyester.

The initiator is a polymerization initiator used for polymerization of the precursors (e.g. monomers) to form the polyester. The polymerization initiator may comprise a polyether, an alcohol, or water. A non-limiting example of the polyether may be a polyethylene glycol. A non-limiting example of the alcohol may be an ethanol.

Polyethylene glycol may be used as the initiator in various instances, and in such instances, there could be the addition of a polyester to one end of the polyethylene glycol. That is to say, a block copolymer of polyether-polyester may be formed. The polyethylene glycol may be or may include methoxy polyethylene glycol (mPEG).

In some instances, an alcohol can be used as an initiator. Non-limiting examples of the alcohol may include methanol, ethanol, propanol, etc. In this case, the polycaprolactone produced may have one end group comprising methyl ester, ethyl ester, or an alcohol ester (depending on the alcohol that is used) and the other end group comprising a hydroxyl group. The procedure that is used for making PEG-PCL as described above may be used. Where alcohol is used as the initiator instead of PEG, the number of moles of alcohol may replace the number of moles of PEG. The melting step for melting the monomer may not be necessary since the alcohol is typically a liquid. Polymer molecular weight may be controlled by varying the amount of caprolactone monomer in the system.

When water is used as an initiator, the polycaprolactone produced may have a carboxyl group as one end group and hydroxyl group as the other end group. The same procedure that is used for making PEG-PCL as described above may be used. Where water is used as the initiator instead of PEG, the number of moles of water may replace the number of moles of PEG. The melting step for melting the monomer may not be necessary when water is used, which may be similar to the case when ethanol is used as the initiator. The gaseous HCl has to be dried even though water is used as the initiator to control the polymer's (i.e. the resultant polyester) molecular weight. The polymer's molecular weight may be controlled by varying the amount of caprolactone monomer in the system with a fixed amount of water. If the gaseous catalyst (HCl) happens to introduce moisture, it may lead to lower molecular weight than originally targeted for a given amount of water, even in cases where water is used as the initiator.

The gaseous HCl may stabilized in the initiator or the precursor (e.g. monomer used to form the polyester). As one example, before adding caprolactone, PEG and the HCl gas may be first mixed to form a system where the PEG becomes impregnated with or contained the HCl. In this regard, this may be referred to as having the "HCl gas stabilized in PEG". The PEG may be in its melted form. The HCl gas may also be stabilized in a mixture containing melted PEG and caprolactone. The HCl gas may also be stabilized in the caprolactone, wherein the caprolactone may be a liquid or a melt at room temperature. HCl may be retained in the polymer melt or liquid polymer even at 100° C.

Example 3A: Estimation of HCl Content in Mixture

The NaOH solution used for titration was standardized by oxalic acid. After the solution mixture containing mPEG and ε-CL was saturated by HCl gas (no more bubbling of HCl gas observed), a portion of the mixture was extracted, diluted with deionized (DI) water and titrated against standardized NaOH solution with phenolphthalein as indicator. The concentration of HCl gas in the solution mixture was estimated to be 0.477 mol/dm$^3$.

Example 3B: Kinetic Studies of Polymerization in Present Method

Figure 5A:
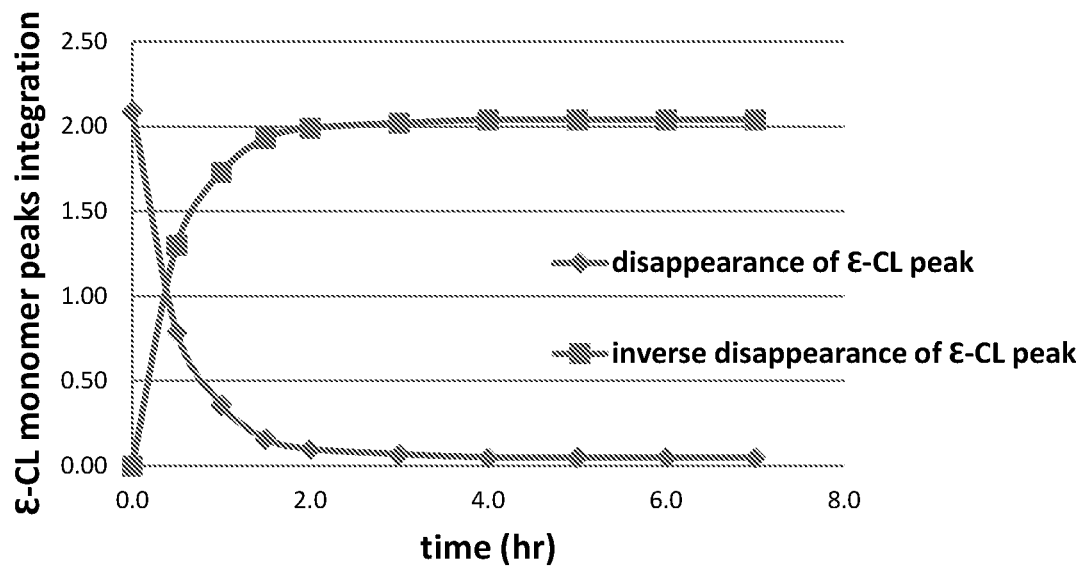
FIG. 5A shows a graphical profile of disappearance of ε-PCL monomer peak against time.

Samplings were taken from the reaction mixture at 0.5, 1.0, 1.5, 2.0, 3.0, 4.0, 5.0, 6.0 and 20 hr intervals and send for $^1$H NMR analysis. The polymerization reaction profile was monitored by the integration of ε-CL monomer peaks (FIG. 5A). According to FIG. 5B, the disappearance of ε-CL monomer peaks was constant from the 4$^{th}$ hour onwards, meaning that the polymerization was already completed in 4 hours. It is not necessary to continue the polymerization to 20 hrs.

Example 3C: Characterization of PEG-PCL Copolymer By $^1$H NMR 10-20 mg of the polymer were dissolved in chloroform-d and the nuclear magnetic resonance ($^1$H NMR) spectra were recorded at room temperature on a Bruker UltraShield AVANCE 300SB spectrometer operating at 300 MHz. Chloroform-d was used as the solvent and the residual solvent peaks were used as internal standard.

Figure 5B:
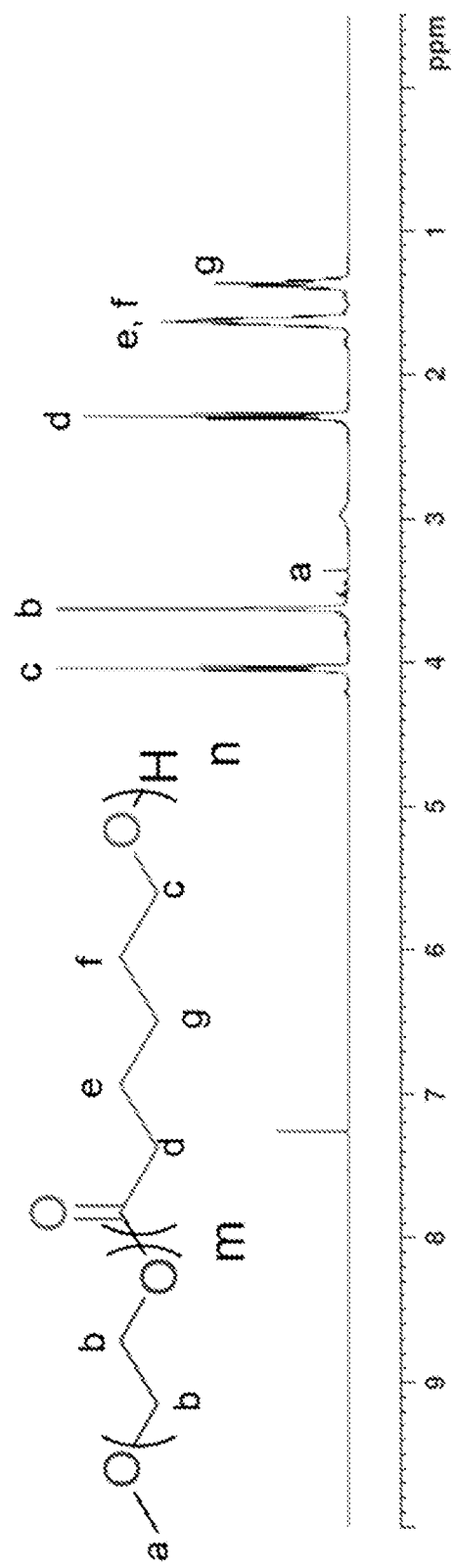
FIG. 5B shows the PEG-PCL $^1$H NMR spectra, wherein the PEG-PCL is synthesized from the present method. m and n may be integers as defined above for FIG. 1A.

From FIG. 5B, peaks at 1.35 and 1.64 ppm are attributed to methylene protons of —(CH$_2$)$_3$— in PCL units while peaks at 2.28 and 4.03 ppm are attributed to methylene protons of —OCCH$_2$— and —CH$_2$OOC— in PCL units, respectively. The distinct sharp peak at 3.62 ppm corresponds to the methylene protons of PEG oxyethylene units. No free ε-CL was present in the polymer products according to the NMR spectra. The solvent chloroform-d peak at 7.26 ppm serves as an internal standard. $^1$H NMR (300 MHz, CDCl$_3$) δ 4.03 (2H, t), 3.62 (4H, s), 2.28 (2H, t), 1.64 (4H, quin), 1.35 (2H, quin).

Example 3D: Characterization of PEG-PCL Copolymer By GPC

Average molecular weight (Mw) and its distribution were determined by gel permeation chromatography (GPC) on Viscotek GPCmax VE2001 system. The chromatography was carried out at 40° C. using Viscotek TDA 302 detector equipped with two PL gel 5 μm Mixed-C columns in an isocratic mode with tetrahydrofuran (THF) as mobile phase at a flow rate of 1.0 mL/min calibrated by standard polystyrenes. The samples were prepared by dissolving 10 mg of the polymer in 2 mL THF and filtered through 0.45 μm membrane filter. 50 μL of the sample was injected and analyzed using Malvern software.

Figure 6A:
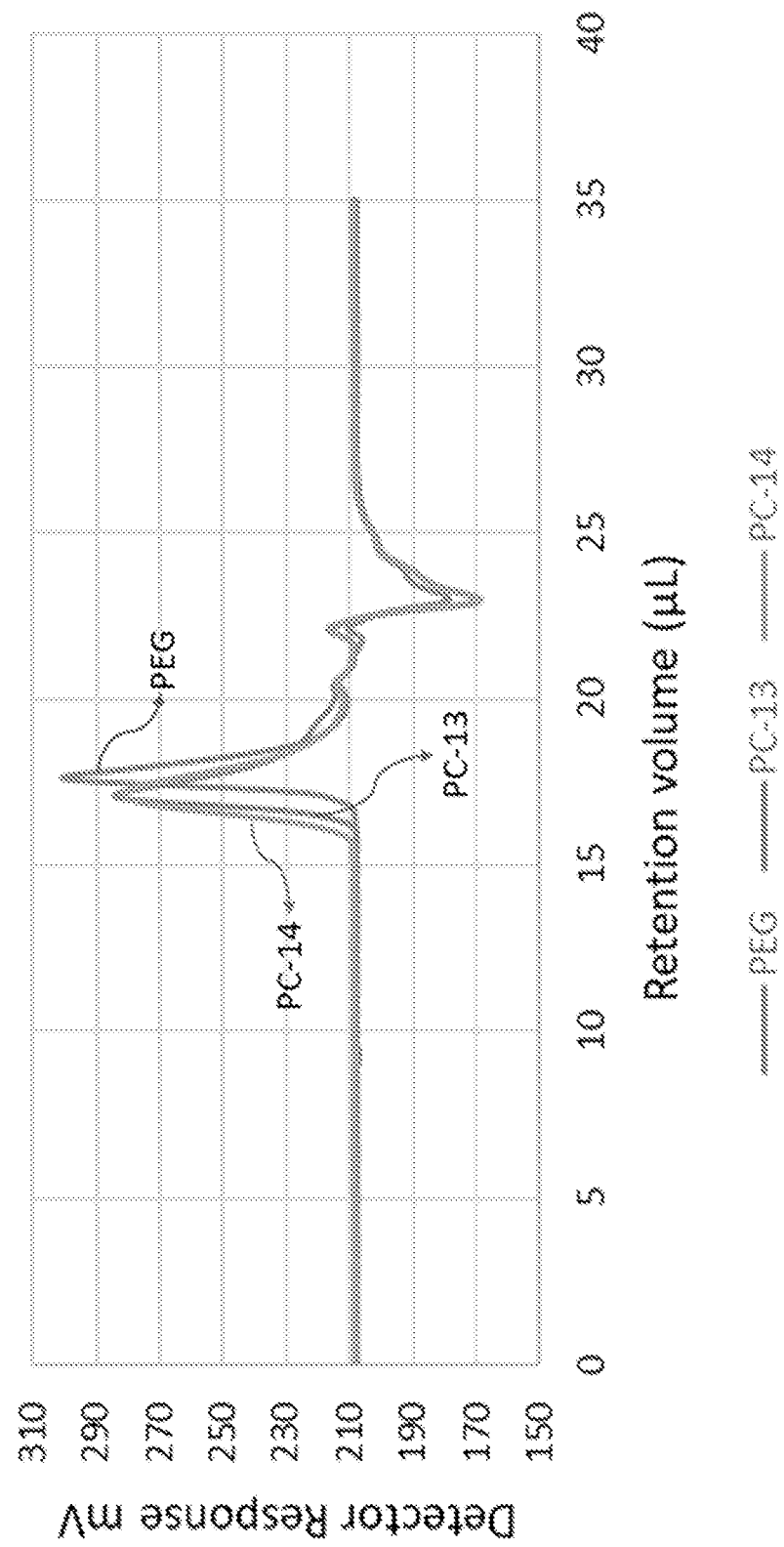
FIG. 6A shows the gel permeation chromatography (GPC) profile of the PEG-PCL synthesized from the present method. The profile is obtained from two PEG-PCL synthesis trials of the present method, demonstrating reproducibility of the present method.
Figure 6B:
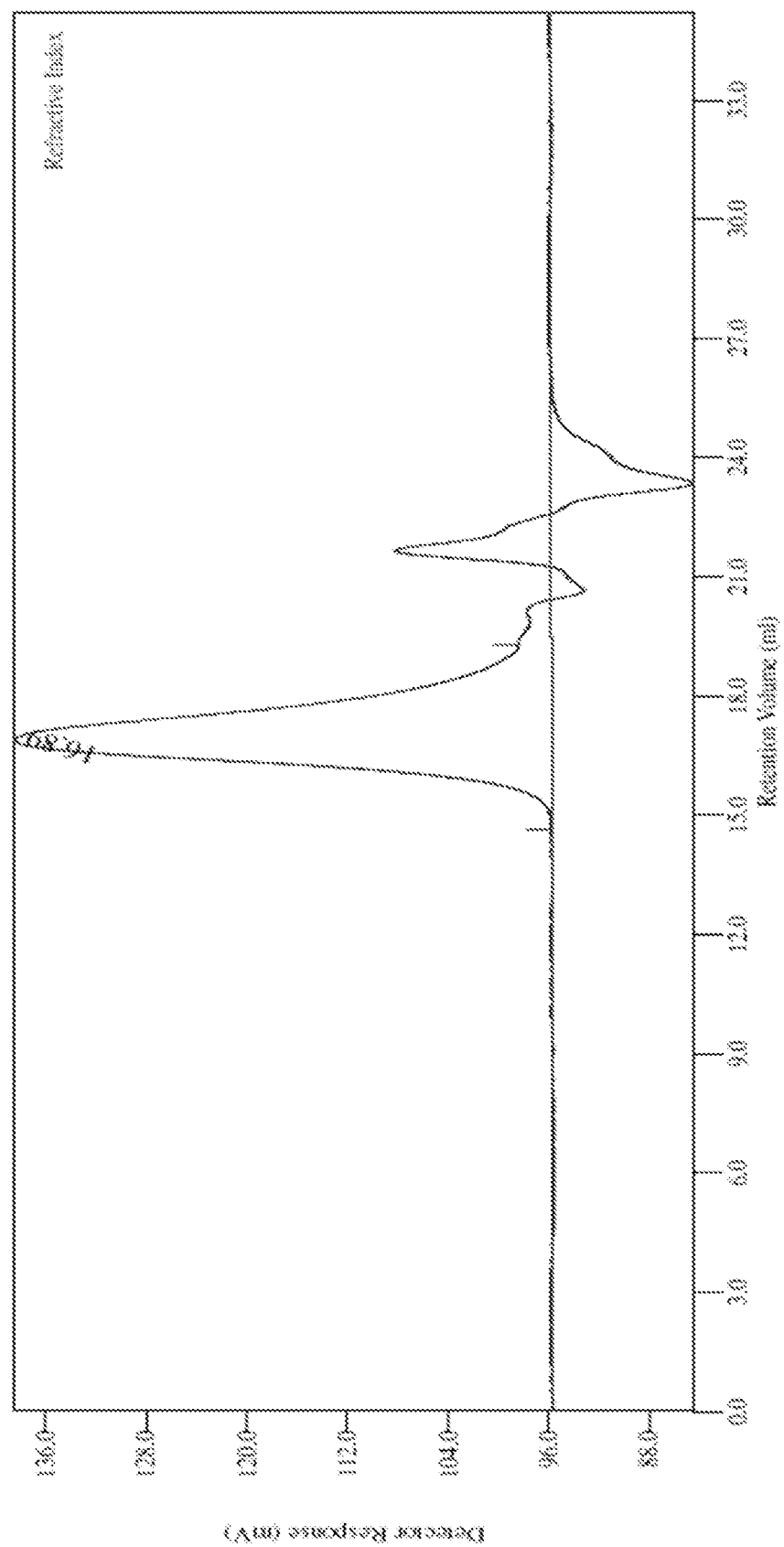
FIG. 6B shows the GPC profile overlay of PEG and PEG-PCL, wherein the PEG-PCL is synthesized from the present method.

From the GPC curve in FIG. 6B, it can be observed that there is a subtle shift between monomer mPEG and copolymer PEG-PCL. The subtle shift indicates the successful synthesis of the copolymer. GPC (Mn=6727, Mw=11225, polydispersity index (PDI)=1.67)

Example 4: Commercial and Potential Applications

In summary, PEG-PCL copolymers have been successfully synthesized through the present method described hereinabove, and this is substantiated by the NMR and GPC characterization results.

The present method may be a one-pot solvent-free and metal-free polymerisation method deemed fast, energy efficient and green. Numerous purification steps are not required compared to conventional synthesis routes. After the resultant polyester is synthesized, the reaction product may be simply bubbled with an inert gas, dried and milled, such that the material obtained may directly be used for encapsulation of pharmaceutical or chemical drugs or other active ingredients. Hence, the present method is a straightforward one-pot synthesis to obtain pure PEG-PCL that may be directly used in encapsulation technology. Moreover, the resultant polyester produced from the present method may be safely used in biomedical applications due to the lack of toxic materials, e.g. toxic metals and solvent, involved.

As mentioned above, no organic solvents or organic catalysts impurities arise in the resultant polyester polymer, as the present is a completely solvent free approach. Said differently, no organic impurities get produced with close to 100% conversion (high purity polyester produced). Since no solvent is used, the present method may have considerably lower costs.

The present method also provides for good molecular weight control. The present method is potentially applicable to many lactones, one example being ε-caprolactone, for forming a polyester.

The present technology may be considered a green technology as it minimizes use of chemicals, involving specifically PEG, sodium chloride, sulfuric acid and monomer. No side products or toxic impurities are produced.

In the present method, the catalyst used is a gaseous inorganic acid, an example of which includes HCl. The HCl gas may be generated in situ and stabilized in a melted precursor, e.g. PEG or mPEG, even at temperatures above 60° C., in a concentration sufficient to catalyze a lactone ring opening to create block copolymers. Using a gaseous catalyst helps to avoid catalysts as an impurity in the resultant polymer produced, which also minimizes unnecessary purification steps as the gaseous catalyst can be easily separated using an inert gas that was used for creating the inert environment which the present method was carried out in.

The present method is distinguished from conventional methods in that HCl may typically need to be solubilized in a solvent for catalysis to occur. Conversely, in the present method, the polymerization initiator, e.g. a PEG macro-initiator, may serve as the medium for HCl to be impregnated therein at slightly elevated temperature without need for any solvents Advantageously, the present method utilizes gaseous HCl for PEG-PCL synthesis, wherein the PEG precursor, as an example, may retain HCl even at 60° C. for polymerization to form the polyester.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An organic solvent-free method of producing a polyester, the method comprising:
providing a mixture comprising at least one precursor of the polyester, wherein the at least one precursor is a liquid, wherein the at least one precursor comprises a caprolactone;
drying a gaseous inorganic acid to remove water from the gaseous inorganic acid; and
contacting the mixture, with the gaseous inorganic acid which is dried, to produce the polyester, wherein drying the gaseous inorganic acid is carried out prior to contacting the mixture with the gaseous inorganic acid and prior to any polymerization which renders the polyester.

2. The method of claim 1, wherein the at least one precursor comprises at least one monomer of the polyester or at least one oligomer of the polyester.

3. The method of claim 1, wherein providing the mixture comprises removing water from the at least one precursor.

4. The method of claim 3, wherein removing the water comprises contacting the at least one precursor with a drying agent.

5. The method of claim 4, wherein the drying agent comprises activated silica, calcium chloride, calcium hydride, or an inert gas.

6. The method of claim 1, wherein the mixture comprises a polymerization initiator.

7. The method of claim 6, wherein the polymerization initiator comprises an alcohol, water, or a polyethylene glycol having one or more terminal hydroxyl groups.

8. The method of claim 1, wherein the polyester comprises poly(ε-caprolactone), poly(lactic acid), or poly(glycolic acid).

9. The method of claim 1, wherein the polyester comprises polyethylene glycol co-polycaprolactone, poly (lactic-co-glycolic acid), polyethylene glycol co-polyvalerolactone, or a polyester appended to polyethylene glycol.

10. The method of claim 1, wherein contacting the mixture with the gaseous inorganic acid comprises generating the gaseous inorganic acid from a chemical agent capable of generating the gaseous inorganic acid.

11. The method of claim 10, wherein generating the gaseous inorganic acid comprises mixing (i) sulfuric acid with sodium chloride or (ii) mixing an alcohol with an acetyl chloride or an acid chloride.

12. The method of claim 1, wherein drying the gaseous inorganic acid to remove water from the gaseous inorganic acid comprises contacting the gaseous inorganic acid with a drying agent.

13. The method of claim 12, wherein the drying agent comprises activated silica, calcium chloride, or anhydrous sulfuric acid.

14. The method of claim 1, wherein contacting the mixture with the gaseous inorganic acid is carried out in an inert environment.

15. The method of claim 1, wherein contacting the mixture with the gaseous inorganic acid is carried out at a temperature which maintains the polyester in a liquid state.

16. The method of claim 15, wherein the temperature is at least 60° C.

17. The method of claim 15, wherein the temperature is 100° C. or less.

18. The method of claim 1, further comprising subjecting the mixture to an inert gas flow to remove the gaseous inorganic acid after the polyester is produced.

19. A polyester obtained according to claim 1.

* * * * *